United States Patent
Estrada et al.

(10) Patent No.: US 10,079,550 B2
(45) Date of Patent: Sep. 18, 2018

(54) SELF-OSCILLATING ENERGY EXTRACTION AND UTILIZATION BOOSTER MODULE CIRCUITS

(71) Applicants: Jerry Estrada, Tampa, FL (US); Stanley Fong, Hazlet, NJ (US); William Toth, Ocean, NJ (US)

(72) Inventors: Jerry Estrada, Tampa, FL (US); Stanley Fong, Hazlet, NJ (US); William Toth, Ocean, NJ (US)

(73) Assignee: Jupiter Technology, Inc., Hazlet, NJ (US)

( * ) Notice: Subject to any disclaimer, the term of this patent is extended or adjusted under 35 U.S.C. 154(b) by 0 days.

(21) Appl. No.: 14/636,066

(22) Filed: Mar. 2, 2015

(65) Prior Publication Data
US 2017/0310125 A1    Oct. 26, 2017

(51) Int. Cl.
*H02M 3/338* (2006.01)
*H04B 5/00* (2006.01)

(52) U.S. Cl.
CPC ......... *H02M 3/338* (2013.01); *H02M 3/3385* (2013.01); *H04B 5/0037* (2013.01); *H04B 5/00* (2013.01); *H04B 5/0012* (2013.01); *H04B 5/0075* (2013.01)

(58) Field of Classification Search
CPC ....................................... H02M 3/338–3/3388
See application file for complete search history.

(56) References Cited

U.S. PATENT DOCUMENTS

| 4,274,044 A * | 6/1981 | Barre | G04C 10/02 136/293 |
|---|---|---|---|
| 4,333,139 A * | 6/1982 | Owen | H02M 7/5383 315/DIG. 7 |
| 4,617,620 A * | 10/1986 | Speranza | H02M 3/155 123/494 |
| 5,895,983 A * | 4/1999 | Motomura | H02M 3/33569 307/106 |
| 7,170,762 B2 * | 1/2007 | Chian | H02M 3/3381 363/19 |
| 2014/0016251 A1 * | 1/2014 | Wahler | H01M 2/1083 361/679.01 |
| 2016/0372915 A1 * | 12/2016 | Baldridge | H02H 3/24 |

* cited by examiner

*Primary Examiner* — Gary L Laxton
*Assistant Examiner* — Peter Novak
(74) *Attorney, Agent, or Firm* — AEON Law, PLLC; Adam L. K. Philipp; David V. H. Cohen

(57) ABSTRACT

A system for extracting energy from an energy storage device configured to supply direct current (DC) energy at a nominal voltage rating comprises a first node dimensioned and arranged to receive direct current energy from the energy storage device. Embodiments include a self-oscillating circuit having primary and secondary windings wound around a ferrite core, wherein a positive terminal of the primary winding is tied to the negative terminal of the secondary winding at the first node, and wherein a positive terminal of the secondary winding is coupled to a second node, the second node being coupled to a load requiring power to be supplied at one of a voltage less than, equal to, or higher than the nominal voltage. Some embodiments further include a transistor having a base resistively coupled to a negative terminal of the primary winding and a collector coupled to the second node.

13 Claims, 11 Drawing Sheets

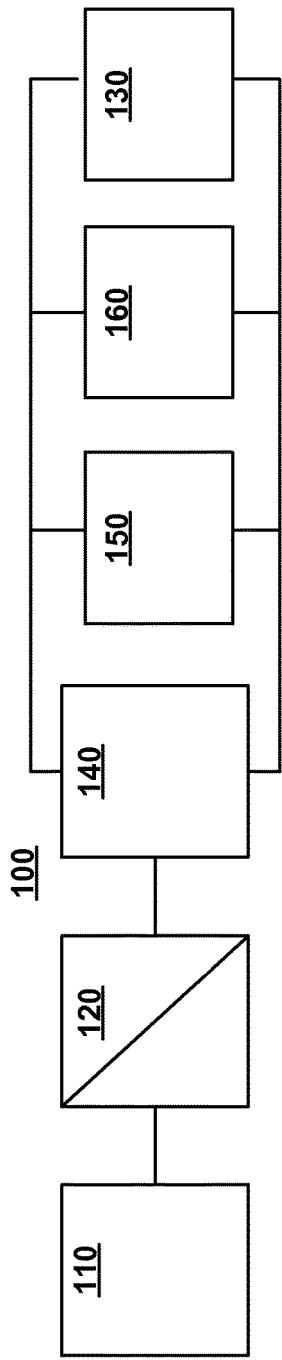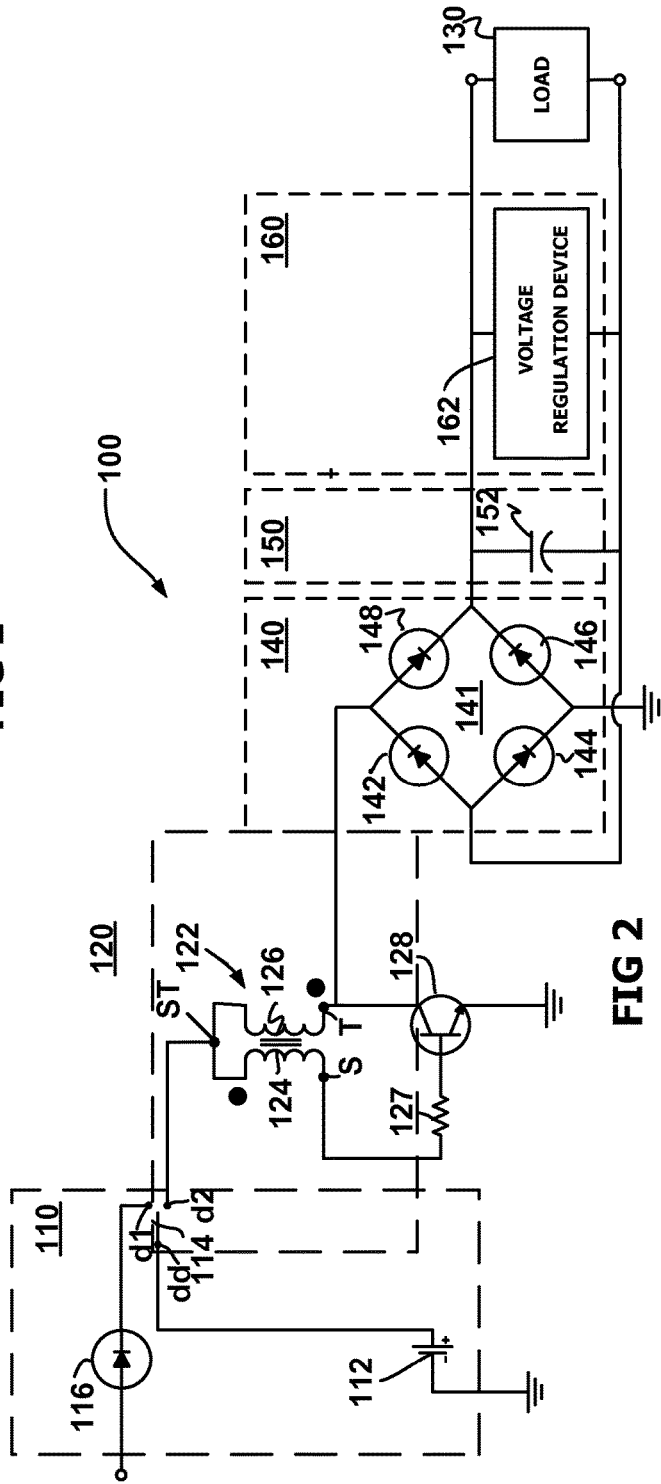
FIG 1
FIG 2

SELF-OSCILLATING ENERGY EXTRACTION AND UTILIZATION BOOSTER MODULE CIRCUITS

REFERENCE TO RELATED APPLICATIONS

This application claims the benefit of priority to U.S. Provisional Patent Application No. 61/945,887 filed on Feb. 28, 2014 and entitled LOW VOLTAGE ENERGY UTILIZATION CIRCUIT.

BACKGROUND OF THE INVENTION

Field of the Invention

Embodiments consistent with the present invention generally relate to circuits and systems for extracting energy from energy storage devices, and to circuits and systems which utilize the same.

Description of the Related Art

To the classically trained circuit designer, the first rule of power supply design is: do not design one yourself if you can buy it off the shelf. Among the many recognized advantages of using a standard power supply module is the fact that it saves a considerable amount of design and testing time, resources which may not be available in small and large enterprises alike. This is especially true where the cycle from conception to launch is short. Whatever the motivation, this tendency toward incorporating off-the-shelf power supply modules can lead to some unfortunate compromises when it comes to the overall design of the final product.

One such compromise can directly affect the form factor of the applicable electronic device. It is well known, for example, that AAA, AA, C, or D battery cells may be used interchangeably so long as they are connected the same way and can be made to fit the device housing. The major difference between these batteries, apart from their physical size, is the total amount of energy which can be stored in them. It is the load, not the battery, which determines how much current actually flows. Stated another way, the difference between the battery sizes isn't voltage, and it isn't current (except under extreme circumstances where the battery is shorted out). It is the product of current*time, which is proportional to the total energy stored. Operating an electronic device with larger batteries having the same voltage means that the batteries will have to be replaced less frequently than if smaller batteries were used.

By convention, a circuit designer faced with specific voltage and current requirements for driving a load (while at the same time seeking to minimize the impact the power supply has on the device's form factor) will choose that "off-the-shelf" power supply which (a) occupies the least amount of space needed, (b) achieves an "acceptable" interval between battery replacement or recharge cycles. This conventional "balancing" often translates into the selection of larger batteries, which may in turn force other design choices that negatively influence the overall utility and/or aesthetic appeal of the finished product.

There are also situations where it is desirable to incorporate a low voltage energy source as an element of a direct current and/or alternating power supply circuit. As one example, an electronic device may be powered by "harvesting" energy from an ambient source. Ambient sources of energy include, but are not limited to, mechanical vibrations, rotations, solar radiation, and thermal gradients. The means of "harvesting" this ambient energy may take the form of an inductive, capacitive, piezoelectric, photovoltaic, or thermoelectric generator (or any combination of these) depending upon the specific ambient source being utilized. At certain times, the "ambient energy generator" may collect substantially more energy than is actually needed to power the associated electronic device (or its active components). It is known that the surplus energy can be stored in a battery or other electrical energy storage device so that the electronic device can be used even when the ambient source of energy is not available.

A continuing need exists for AC and/or DC power supplies able to meet the voltage and current demands of the electronic devices for which they are intended, without forcing the designer to make sacrifices that affect the utility or aesthetic appeal of the device.

A further need exists for space efficient AC and/or DC power supplies able to make use of energy harvested from such low voltage, low energy ambient sources as mechanical vibrations, rotations, solar radiation and thermal gradients.

A further need exists for space efficient AC and/or DC power supplies able to make use of energy supplied by conventional sources of power such as alternating current sources.

SUMMARY OF THE INVENTION

The inventors herein propose circuits and systems to efficiently extract and, in some embodiments utilize, power supplied by one or more direct current (DC) power sources in order to drive one or more loads. In some embodiments, the operating cycle of each power source is extended and, in other embodiments, a more compact form factor for the power source(s) is obtained.

In an embodiment consistent with the claimed invention, a system for extracting energy from an energy storage device is configured to supply direct current (DC) energy at a nominal voltage rating and comprises a first node dimensioned and arranged to receive direct current energy from the energy storage device. The system includes a self-oscillating circuit having primary and secondary windings wound around a ferrite core, wherein a positive terminal of the primary winding is tied to the negative terminal of the secondary winding at the first node, and wherein a positive terminal of the secondary winding is coupled to a second node, the second node being coupled to a load requiring power to be supplied at one of a voltage less than, equal to, or higher than the nominal voltage. Some embodiments further include a transistor having the base resistively coupled to a negative terminal of the primary winding, the collector electrically coupled to the second node, and the emitter electrically coupled to ground.

In another embodiment consistent with the claimed invention, a system for emulating a battery having a first form factor comprises a housing having a first external electrode and a second external electrode, the housing defining an interior volume dimensioned and arranged to receive a battery having a second form factor smaller than the first form factor. The system further includes an energy extraction circuit configured to extract energy from a battery received within the interior volume, the received battery being configured to supply direct current (DC) energy at a nominal voltage rating. In an embodiment, the energy extraction circuit includes a first node dimensioned and arranged to receive direct current energy from the received battery, and a self-oscillating circuit. In an embodiment, the self-oscillating circuit includes a toroidal transformer having a ferrite core and primary and secondary windings about the ferrite core, wherein a positive terminal of the primary winding is tied to the negative terminal of the secondary winding at the first node, and wherein a positive terminal of the secondary winding is coupled to a second node, the second node being coupled to a load requiring power to be supplied at a voltage equal to the nominal voltage. The system further includes a transistor having a base resistively coupled to a negative terminal of the primary winding and a collector coupled to the second node.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is a block diagram schematic depicting the functional elements of a DC-DC power supply arrangement employing an energy extraction circuit constructed in accordance with an embodiment of the present invention;

FIG. 2 is a schematic diagram illustrating an arrangement of interconnected circuit elements for realizing a circuit for extracting energy from a low voltage energy storage device, such as a battery, in accordance with an embodiment of the present invention;

Figure 3:
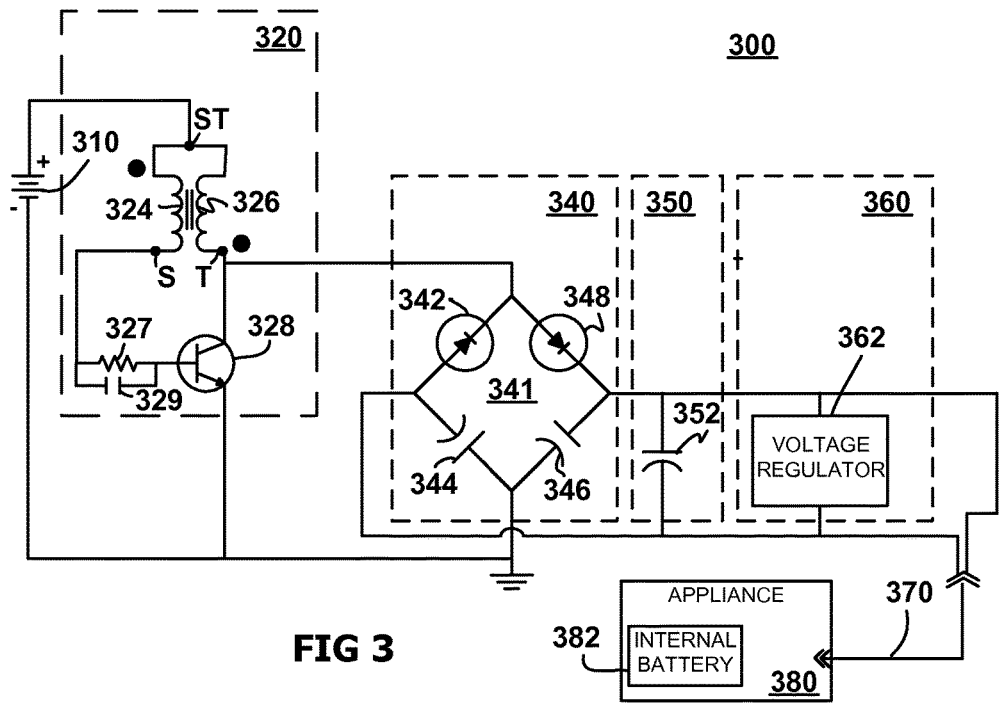
FIG. 3 is a schematic diagram of an energy extraction circuit configured to utilize the power supplied by an external energy storage device to drive an electrical appliance at times, for example, when the electrical needs of the electrical appliance are not met by an internal battery, according to one or more embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments consistent with the claimed invention include a system and method for extracting and, in some embodiments utilizing, power supplied by one or more direct current (DC) power sources in order to drive one or more loads. In embodiments, the operating cycle of at least some of the one or more sources is extended. Additionally, or alternatively, a more compact form factor for the power source(s) is obtained. A number of device implementations of energy extraction systems according to one or more embodiments are also illustrated and described in the present disclosure, it being contemplated by the inventors herein that such implementations are intended to serve as illustrative and non-limiting examples only.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

FIG. 1 is a block diagram schematic depicting the functional elements of a DC-DC power supply arrangement 100 constructed in accordance with an exemplary embodiment consistent with the claimed present invention. The power supply arrangement 100 includes an energy source 110 which, in some embodiments, comprises one or more energy storage devices such, for example, as alkaline dry cell or lithium ion batteries having a nominal voltage output rating (e.g., 1.5v). In some embodiments, energy source 110 also includes one or more input terminal(s) for receiving the output of a low voltage, low power energy collector harvesting ambient energy (not shown), an AC to DC converter (also not shown), or a combination of these. By way of illustrative example, the input terminal(s) of energy source 110 may be electrically coupled to one or more solar cells or panels dimensioned and arranged to harvest incident light.

The power developed from solar collection may, at least part of the time, be insufficient for directly powering the device for which power supply arrangement 100 is intended. In such cases, power received via the one or more input terminals may be used to trickle charge one or more rechargeable energy storage device(s). Alternatively, or in addition, the rechargeable energy storage device(s) may be charged via an AC to DC converter (not shown).

As yet another example, the DC energy source 110 of power supply arrangement 100 may consist solely of one or more non-rechargeable batteries (or alternative storage device). It suffices to say that energy extraction and/or utilization circuits and arrangements consistent with the present disclosure may be readily adapted to work with a wide variety of low voltage energy sources.

In any event, and with continued reference to the exemplary embodiment of FIG. 1, it will be seen that in some embodiments consistent with the present disclosure, the output of DC energy source 110 is supplied to a self-oscillating, step-up or "booster" module indicated generally at reference numeral 120. In some embodiments, the nominally rated voltage of DC energy source 110 is increased so as to meet the power drawn by the active circuitry of an electronic device. In other embodiments, the boost in voltage takes place only when necessary—i.e., when the voltage output by DC energy source 110 falls below its nominally rated output (as will occur where recharging occurs at a rate slower than the rate of discharge, or where no charging operation is performed at all).

In FIG. 1, the power demand causing the DC energy source 110 to discharge is represented conceptually in FIG. 1 as a resistive load indicated generally at reference numeral 130. In one or more embodiments, before the output of booster module 120 is applied to the load, it is first passed through a rectification module 140, a filtering module 150, and a voltage regulating module 160.

FIG. 2 is a schematic diagram illustrating an arrangement of interconnected circuit elements for realizing power supply arrangement 100, in accordance with an embodiment of the present invention. In the exemplary embodiment of FIG. 2, energy source 110 of power supply arrangement 100 includes a rechargeable battery indicated generally at reference numeral 112, single pole double throw (SPDT) switch 114, and diode 116. In one position of switch 114, terminals dd and d1 are connected and a low voltage current applied to the anode of diode 16 is permitted to flow into rechargeable battery 112. When the position of switch 114 is changed to connect terminals dd and d2, this charging operation is interrupted and current flows out of battery 112 and into booster module 120.

Although the illustrative example of FIG. 2 depicts an arrangement in which a single rechargeable battery is charged by a single low voltage DC power source, these elements may be omitted in situations where a stable source of DC power is available, or when the use of non-rechargeable batteries is preferred (e.g., for cost savings). Alternatively, more than one battery or other energy storage device can be recharged at a time and/or more than one low-voltage DC power source (e.g., a different type or category of DC power source) may be utilized to perform the charging.

In any event, and with continuing reference to FIG. 2, it will be seen that the nominally rated DC voltage supplied by DC source 110 is applied to the input of booster module 120. Booster module 120 includes a transformer 122 that has a ferrite core and a primary winding 124 and a secondary winding 126 wound around the core. In an embodiment, the ferrite core of transformer 122 is configured as a toroid. To enable the boost-inducing oscillation, the number of times a first wire is wrapped around the toroid core to form the primary winding 124 is equal to the number of times a second wire is wrapped around the toroid to form the secondary winding 126. By way of illustrative example, the number of turns used for each of the primary and secondary windings may be on the order of fifteen, though a larger or smaller number may be used depending upon the voltage of the energy source and degree of the boost required to power the load. The primary and secondary windings are tied together at one end for electrical coupling to energy source 112 and to respective terminals of a transistor 128 operative to switch on and off to alternatively store energy within secondary winding 126 and transfer that energy to the full wave rectifier circuit 141 (i.e., at each oscillation).

In some embodiments, the transistor 128 is a bipolar junction transistor such, for example as an NPN or PNP transistor. Throughout the several views of the present disclosure, the use of a bipolar NPN transistor is exemplified and described in detail. A PNP transistor may be readily substituted by reversing the polarity perspective (i.e., by reorienting the battery 112, bridge diodes 142, 144, 146 and 148, filtering capacitor 152, voltage regulator device 162, and the load 130, by 180°). Moreover, the transistor 128 may alternatively be realized by a metal oxide semiconductor field effect transistor (MOSFET) or a junction gate field effect transistor (JFET), although more extensive alterations to the circuit depicted in FIG. 2 would be required.

Each of windings 124 and 126 includes a positive terminal (indicated with a dot) and a negative terminal. In the illustrative embodiment of FIG. 2, the positive terminal of winding 124 is connected to the negative terminal of winding 126 at the point indicated generally at ST. Point ST is connected to the energy source 112 or, alternatively, to a charging source (not shown) via diode 116, via terminal d2 of switch 114. The negative terminal of primary winding 124 is connected to one terminal of resistor 127. The other terminal of resistor 127 is connected to the base of bipolar NPN transistor 128. The positive terminal of secondary winding 126 is connected to the collector of transistor 128. The emitter of transistor 128 is connected to ground.

The collector of NPN transistor 128 and the positive terminal of secondary winding 126 are tied directly to an input of rectification module 140. In the illustrative embodiment of FIG. 2, rectification module 140 is implemented by a full wave rectifier circuit 141 comprising diodes 142, 144, 146, and 148. Filtering module 150, in the form of capacitor 152, is connected in parallel across rectifier circuit 141 in the manner shown in FIG. 2. In an illustrative embodiment of the circuit depicted in FIG. 2, voltage regulation module 160 is implemented in the form of a single Zener diode whose terminals are connected across the terminals of capacitor 152. The terminals of the voltage regulation module are also connected across the load represented in equivalent form and indicated generally in FIG. 2 by the reference numeral 130.

The operation of the exemplary circuit of FIG. 2 will now be described. When switch 114 is in a position which enables the flow of current from battery 112, the current flows through the positive terminal of primary winding 124 and into resistor 127. A voltage is developed across the base-emitter junction of transistor 128, causing it to operate in saturation mode. Current flows through secondary winding 126 and through the collector-emitter junction of the transistor to ground. The ferrite core of the transformer saturates, causing the current in primary winding 124 to decrease until transistor 128 is turned off. This, in turn, causes current to flow through secondary 126 and into full wave rectifier 141 of rectification module 140. The voltage delivered to full wave rectifier circuit 141 is a combination of the battery voltage plus the voltage developed within secondary winding 126. The output of rectifier circuit 141 is delivered to filtering capacitor 152 of filtering module 150. Voltage regulation module 160 regulates the voltage and delivers it across the terminals of the load 130. The energy stored in the energy storing inductor represented by secondary winding 126 is transferred to the full wave rectifier circuit 141 at each oscillation.

The power supply arrangement of FIG. 2 is considered to be in the free oscillation state until the voltage on the positive terminal of secondary winding 126 returns to a voltage value that allows transistor 128 to enter a conductive state again (the linear region of operation) and transition once more (from the linear region of operation) to operating in saturation again. As transistor 128 begins to conduct again, the current through primary winding 124 also begins to increase again and a new cycle of applying power to rectification module 140 is commenced.

Among the benefits which may be realized by applying the teachings of the invention are: (1) utilization of residual charge and electromotive force within a battery or other electrical energy storage device to provide a minimally required voltage to drive a load when the battery (or batteries) or other electrical energy storage device in itself has an insufficient nominal voltage rating to drive the desired load; (2) augmentation of a DC power source's voltage once the voltage drops below that of the DC power source's rated voltage; (3) delivery of an electrical load's required minimum voltage when a DC-DC converter constructed according to the invention is used in conjunction with a battery or other electrical energy storage device, or a DC power source; (4) conversion of energy from one form or alternative source to be employed to charge a battery or other electrical storage device; (5) isolation of an electrical load from the DC-DC converter circuit while utilizing an energy source to charge a battery or other electrical storage device; (6) isolation of a battery from a charging energy source when utilizing energy from the battery (or the energy source) to drive the electrical load; and (7) application of harvested energy (e.g., by charging of a rechargeable battery or other electrical storage device) to meet the power requirements of an electrical load. These benefits will become apparent by reference to representative applications and examples, which will now be described by reference to FIGS. 3 to 18.

FIG. 3 is a schematic diagram of an energy extraction circuit 300 configured to utilize the power supplied by an external energy storage device 310 such, for example, as one or more batteries, to drive an electrical appliance 380 when the electrical needs of the electrical appliance are not met by its internal battery 382, according to one or more embodiments. In an embodiment, the blocks 320, 340, 350 and 360 of circuit 300 correspond to blocks 120, 140, 150 and 160 of the arrangement 100 depicted in FIGS. 1 and 2. For example, as booster module 120 of FIG. 2, booster module 320 includes a toroidal transformer 322 that has a ferrite core and a primary winding 324 and a secondary winding 326 wound around the core. Each of windings 324 and 326 includes a positive terminal (indicated with a dot) and a negative terminal.

Likewise, as in the illustrative embodiment of FIG. 2, the positive terminal of primary winding 324 of energy extraction circuit 300 is connected to the negative terminal of winding 326 at the point indicated generally at ST. Point ST is connected to the positive electrode of external battery 310. The negative terminal of primary winding 324 is connected to one terminal of resistor 327. The other terminal of resistor 327 is connected to the base of bipolar NPN transistor 328. The positive terminal of secondary winding 326 is connected to the collector of transistor 328. The emitter of transistor 328 is connected to ground. The inventors herein have also discovered that if a non-polarized capacitor 329 is incorporated into the extraction circuit 300, in parallel with the base resistor 327 as shown in FIG. 3, it will substantially reduce the operating temperature of transistor 328 and provide a "kick start" to the oscillation.

The collector of NPN transistor 328 and the positive terminal of secondary winding 326 are tied directly to an input of rectification module 340. In the illustrative circuit 300 depicted in FIG. 3, as rectification module 340 is implemented as rectifier circuit 341 comprising diodes 342 and 348, and capacitors 344 and 346. The polarity of the capacitors is such that the positive connection is coupled tot the cathode of each diode. This arrangement provides a means of doubling the output voltage. In an embodiment, filtering module 350 comprises a capacitor 352 connected in parallel across rectifier circuit 341 in the manner shown in FIG. 3. In an illustrative embodiment of the circuit depicted in FIG. 3, voltage regulation module 360 is implemented in the form of a single Zener diode whose terminals are connected across the terminals of capacitor 352. In an embodiment, the output of the voltage regulation module is electrically coupled to the external appliance 380 by a plug-in connection as, for example, a Universal Serial Bus (USB) adapter connection via USB cable 370.

The external energy storage device 310 may be of a voltage well below the nominal output rating of the internal storage battery 382 typically used to drive the appliance 380. Moreover, in addition to supplying the appliance 380 with sufficient power to enable operation in the event the internal storage battery 382 should fall below a critical voltage threshold, the power extraction circuit 300 is further operative to charge that battery so as to enable its normal function as the primary power source for appliance 380.

Figure 4:
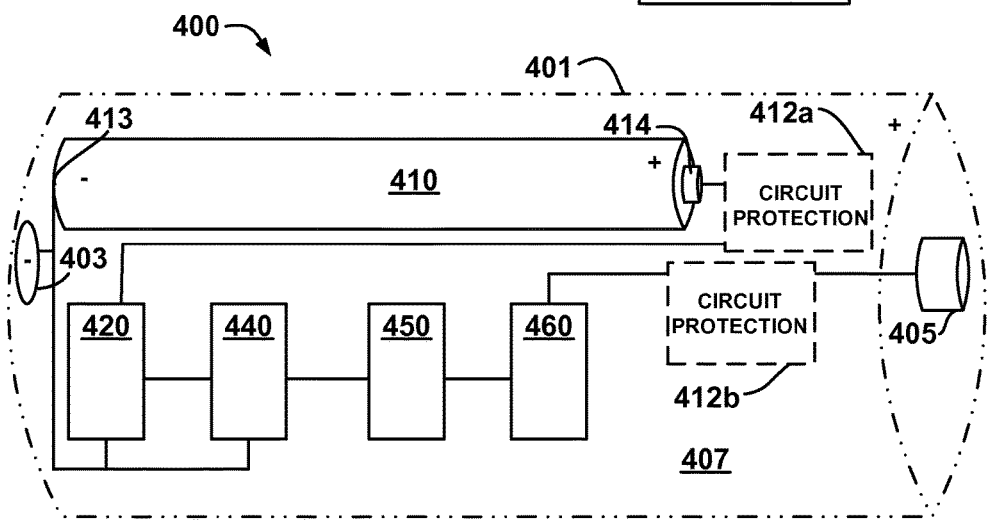
FIG. 4 depicts a schematic diagram of a battery emulating system configured to emulate the physical and electrical characteristics of a battery having a first form factor by extracting electrical energy from a battery having a second form factor smaller than the first form factor, according to one or more embodiments.

FIG. 4 depicts a schematic diagram of a battery emulating module or system 400 configured to emulate the nominal physical and electrical characteristics of a battery having a first form factor by extracting electrical energy from an inserted battery 410 having a second form factor smaller than the first form factor, according to one or more embodiments. In association with energy extraction modules 420, 430, 450, and 460, battery or batteries 410 supply direct current (DC) energy at a nominal voltage rating corresponding to that of the larger form factor battery emulated by battery emulator (or battery enhancement) module 400.

To this end, the battery emulating module 400 includes a housing 401 having a first external (e.g., negative) electrode 403 and a second (e.g., positive) external electrode 405, the housing 401 defining an interior volume 407 dimensioned and arranged to receive one or more reduced form factor battery or batteries as battery 410 as well as the booster module 420, rectifying module 440, filtering module 450, and voltage regulating module 460, each as already described with respect to corresponding counterparts in the arrangements of FIGS. 2 and 3, respectively. As such, boost module 420 includes a first node dimensioned and arranged to receive direct current energy from the received battery; a self-oscillating circuit including a transformer having a ferrite core and primary and secondary windings about the ferrite core, wherein a positive terminal of the primary winding is tied to the negative terminal of the secondary winding at the first node, and wherein a positive terminal of the secondary winding is coupled to a second node, the second node being coupled to a load requiring power to be supplied at a voltage equal to the nominal voltage; and a transistor having a base resistively coupled to a negative terminal of the primary winding and a collector coupled to the second node. Modules 450 and 460 include a capacitor and Zener diode (or other suitable regulating components), respectively.

Optionally, battery emulator module 400 may further include one or more integral circuit protector modules as, for example, a thermal fuse and/or a positive temperature coefficient (PTC) thermistor, to provide additional protection of circuit components. In an embodiment, a circuit protection module 412*a* electrically couples external positive electrode 405 of emulator module 400 to the external positive electrode 414 of the battery or batteries 410. Alternatively, or in addition, a circuit protection module 412*b* electrically couples the regulator module 460 with the external positive electrode 405 of emulator module/battery enhancement module 400.

In embodiments, the external negative electrode 413 of the battery or batteries 410 is directly connected to the external negative electrode 403 of the emulator 400. It will thus be readily appreciated that a variety of battery form factors can be accommodated, for a host of electrical appliances designed to use them, without the need for actually carrying the actual corresponding battery types in the invention. Thus, for example, in a situation where a lantern battery or D-cell batteries would normally be required to operate a flashlight or other emergency device, a user of one or more battery emulating modules constructed according to one or more embodiments described herein would have the option of utilizing other more ubiquitous batteries he or she may have on hand.

Figure 5:
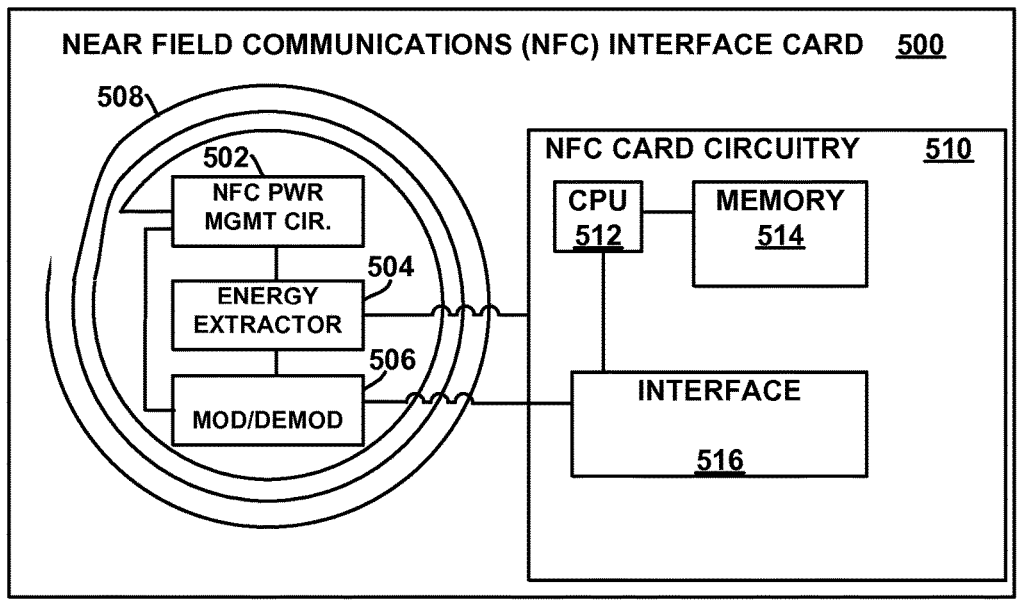
FIG. 5 depicts a block diagram of a near-field communications (NFC) card utilizing an internal energy extraction circuit to provide a voltage boost and power conditioning to the output of a primary power source to increase the useful range of a communication link and/or to facilitate the use of a more compact primary power source, according to one or more embodiments.

FIG. 5 depicts a block diagram of a near-field communications (NFC) card device 500 utilizing an internal energy extraction circuit 504 to provide a voltage boost and power conditioning, to the output of a primary power source forming part of a conventional power management circuit 502, in order to increase the useful range of a communication link and/or to facilitate the use of a more compact primary power source, according to one or more embodiments.

Energy extraction circuit is configured as circuit 300 of FIG. 3, and includes the same general components of a self-oscillating circuit, rectifying module, filtering module and voltage regulating module (which have been omitted from FIG. 5 for clarity. The energy extraction circuit 504 receives power output from NFC power management circuitry or module 502, which is also coupled to antenna 508, and conditions the output to provide the voltage and current required to drive the remaining circuitry of the NFC card device 500. The circuitry of NFC card device 500 includes a modulator/demodulator circuit 506 which, in turn is coupled to other circuitry 510 used to generate signals for transmission and or process the input received via antenna 508; In the embodiment of FIG. 5, circuitry 510 includes one or more central processing units (CPUs) 512, a memory 514, and a RX/TX interface 516.

In the case of an NFC card which incorporates an additional power source such as, but not limited to, a battery (not shown), the energy extraction circuit 504 enhances the performance of the power source by either increasing the useful life (e.g., by providing an additional voltage boost and power conditioning to drive the internal circuitry 510) and increasing the operating range, or by facilitating a smaller overall device form factor via the utilization of a power source and/or charging capacity which is lower than what would have been required to achieve the nominally required operating range and performance characteristics.

Figure 6:
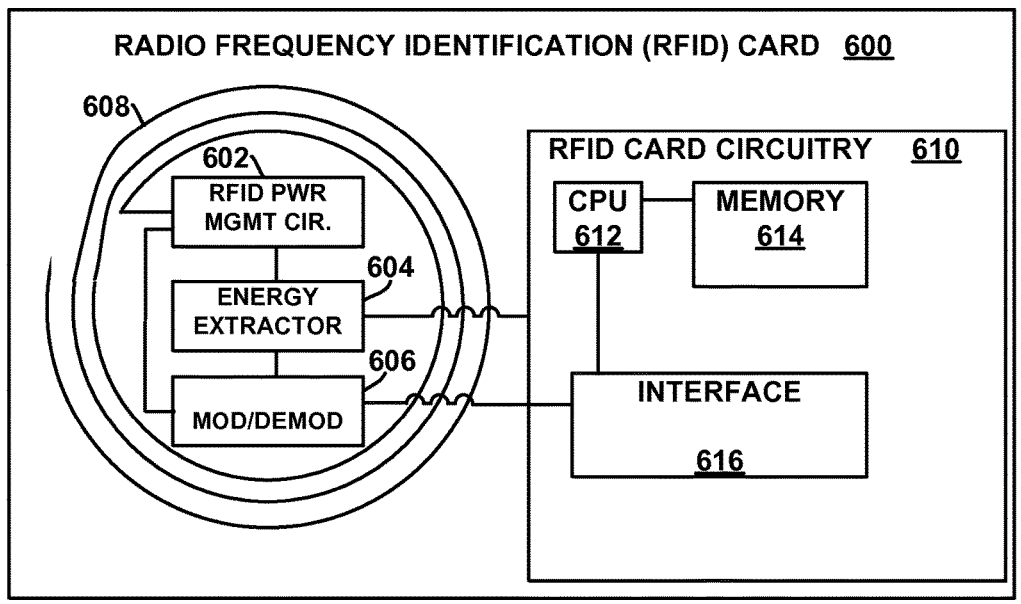
FIG. 6 depicts a block diagram of a radio frequency identification (RFID) tag utilizing an internal energy extraction circuit to provide a voltage boost and power conditioning to the output of a primary power source to increase the useful range of a communication link and/or to facilitate the use of a more compact primary power source, according to one or more embodiments.

FIG. 6 depicts a block diagram of a radio frequency identification tag 600 utilizing an internal energy extraction circuit 604 to provide a voltage boost and power conditioning, to the output of a primary power source forming part of a conventional power management circuit 602, in order to increase the useful range of an RFID communication link and/or to facilitate the use of a more compact primary power source, according to one or more embodiments.

Energy extraction circuit 604 is configured as circuit 300 of FIG. 3, and includes the same general components of a self-oscillating circuit, rectifying module, filtering module and voltage regulating module (which have been omitted from FIG. 6 for clarity. The energy extraction circuit 604 receives power output from RFID power management circuitry or module 602, which is also coupled to antenna 608, and conditions the output to provide the voltage and current required to drive the remaining circuitry of the RFID tag device 600. The circuitry of RFID tag device 600 includes a modulator/demodulator circuit 606 which, in turn is coupled to other circuitry 610 used to generate signals for transmission via and or process the input received via antenna 608; In the embodiment of FIG. 6, circuitry 610 includes one or more central processing units (CPUs), 612, a memory 614, and a RX/TX interface 616.

In the case of an RFID tag device which incorporates an additional power source such as, but not limited to, a battery (not shown), the energy extraction circuit 604 enhances the performance of the power source by either increasing the useful life (e.g., by providing an additional voltage boost and power conditioning to drive the internal circuitry 610) and increasing the operating range, or by facilitating a smaller overall device form factor via the utilization of a power source and/or charging capacity which is lower than what would have been required to achieve the nominally required operating range and performance characteristics.

Figure 7:
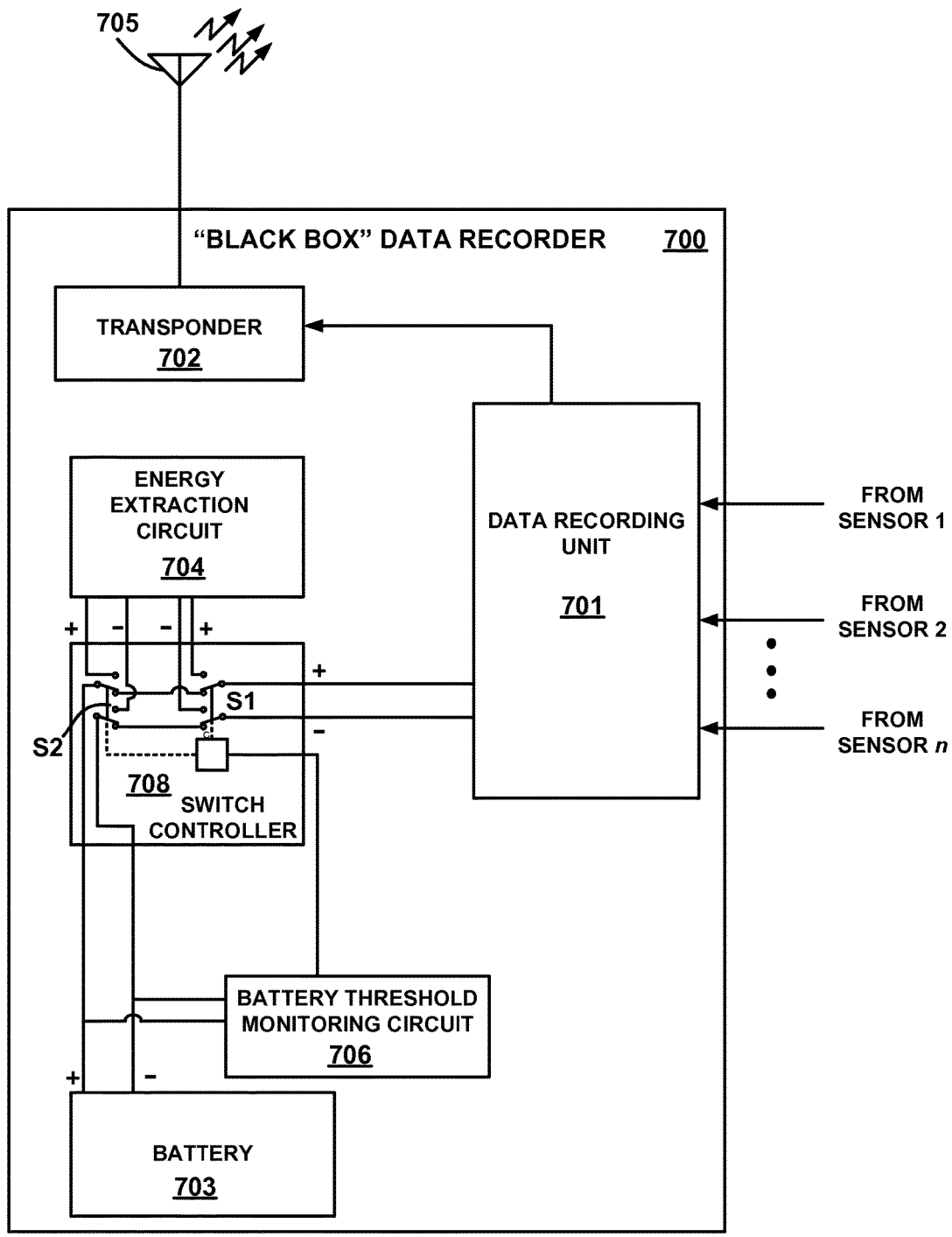
FIG. 7 depicts a block schematic diagram of a flight data recorder system configured to utilize an internal energy extraction circuit to drive critical location-reporting (e.g., transponder) function, for example, once a determination is made that the function is not being met by an internal battery, according to one or more embodiments.

FIG. 7 depicts a block schematic diagram of a flight data recorder system 700 configured to utilize an internal energy extraction circuit 704 to drive critical location-reporting as, for example, the function of transponder 702, once a determination has been made that the power requirements of the transponder can no longer be met by a primary power source, as, for example, an internal battery 703. System 700 includes the data recording unit 701, which may have a plurality of input terminals for signals from one or more sensors as sensors $S_1$ to $S_n$, for the collection and storage of data pertaining to altitude, speed, atmospheric conditions (temperature and pressure), GPS location data, and/or control input history. In alternate embodiments, the data recording unit 701 may perform the functions of a cockpit voice recorder, capturing the utterances of the flight crew prior to and during an emergency event. The occurrence of an emergency event causes a transponder triggering mechanism (not shown) to initiate the transmission of a homing beacon signal by transponder 702 via an integral antenna 705.

System 700 further includes a primary power source output monitoring module or circuit 706 which is electrically coupled to the output terminals of battery 703. Monitoring module 706, provides control input to a switch controller 708, the purpose of the latter being to trigger engagement of the energy extraction circuit 704 once the output of battery 704 falls below a threshold too low to operate transponder 702 in the absence of a "boost". In some embodiments, the switch controller includes a pair of double pole, double throw switches, indicated generally at $S_1$ and $S_2$, The switch $S_1$, diverts power being output by battery 703 away from a direct electrical connection to data recording unit 701 and into the energy extraction unit 704. Similarly, the switch $S_2$ enables the now "boosted" output obtained from energy extraction unit 704 to be supplied to the power input terminals of the data recording unit 701.

As in the case of the above-described NFC and RFID embodiments, the benefits of incorporating an energy extraction circuit, as circuit 704 of FIG. 7, can be viewed from at least two different perspectives. On the one hand, enabling a "black box" unit to continue transmitting its beacon signal beyond the point at which it would otherwise be able to do so could make the difference between identifying the location of a crash site and not being able to do so. On the other hand, assuming that it is instead desirable to simply maintain a beacon transmission capability over a specified duration, the incorporation of a voltage boosting capability in accordance with one or more embodiments confers the benefit of allowing a power source of smaller charge storage capacity.

Figure 8:
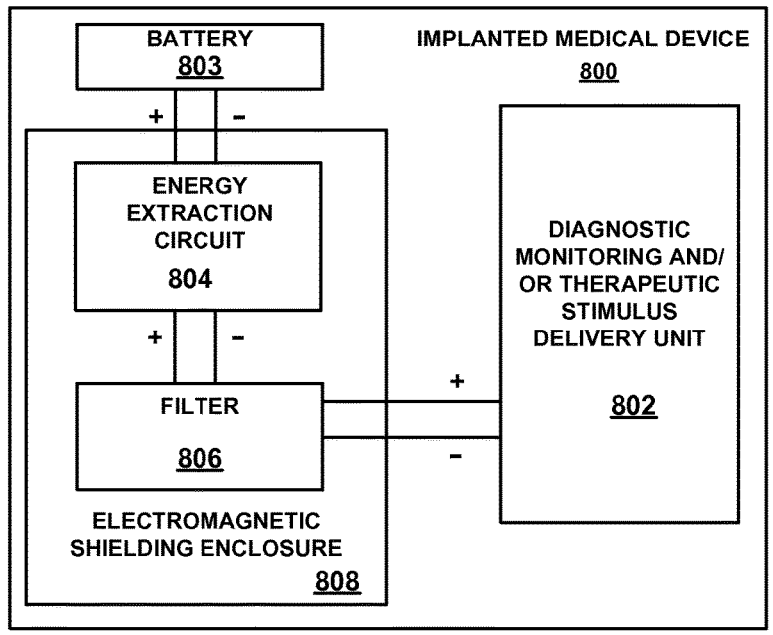
FIG. 8 depicts a block schematic diagram of an implanted medical monitoring and/or therapeutic stimulus delivery device powered by an internal, shielded, energy extraction circuit that extracts and filters the output of a compact internal power source, according to one or more embodiments.

FIG. 8 depicts a block schematic diagram of an in vivo implantable medical monitoring and/or therapeutic stimulus delivery system 800 powered by an internal, shielded, energy extraction circuit 804 that extracts and filters the output of a compact internal power source 803, according to one or more embodiments In an embodiment, the energy extraction circuit 804 is placed within a shielding enclosure 808 that prevents the release of any electromagnetic energy, developed by circuit 804, which might otherwise have the potential to interfere with the safe and expected operation of the diagnostic monitoring and/or therapeutic stimulus delivery device 802 that is powered by it. In some embodiments, a filter is also disposed within the shielding enclosure 808, the filter serving to electrically interconnect the energy extraction circuit 804 with implantable monitoring and/or therapeutic stimulus delivery unit 802.

The monitoring and/or therapeutic stimulus delivery unit 802 may be comprised of any electrically powered device intended to be implantable into or onto the body of a human or animal. Thus, for example, the device may comprise a heart monitoring unit adapted to periodically transmit updates to a nearby docking station or remote monitoring base station. Alternatively or in addition, the device 802 may incorporate a pace making function for ensuring that the heart muscle of a patient maintains a desired rhythm. Alternatively, the device 802 may comprise an insulin dispensing mechanism adapted to monitor the blood sugar level of a patient and/or inject a bolus of insulin into the patient at a required time or interval.

As discussed above in connection with preceding examples, depending upon the objectives of the system designer, the application of energy extraction according to embodiments consistent with the present disclosure may either relax the charge storage requirements associated with the power source as battery 802, or result in a longer operating and/or replacement cycle.

Figure 9:
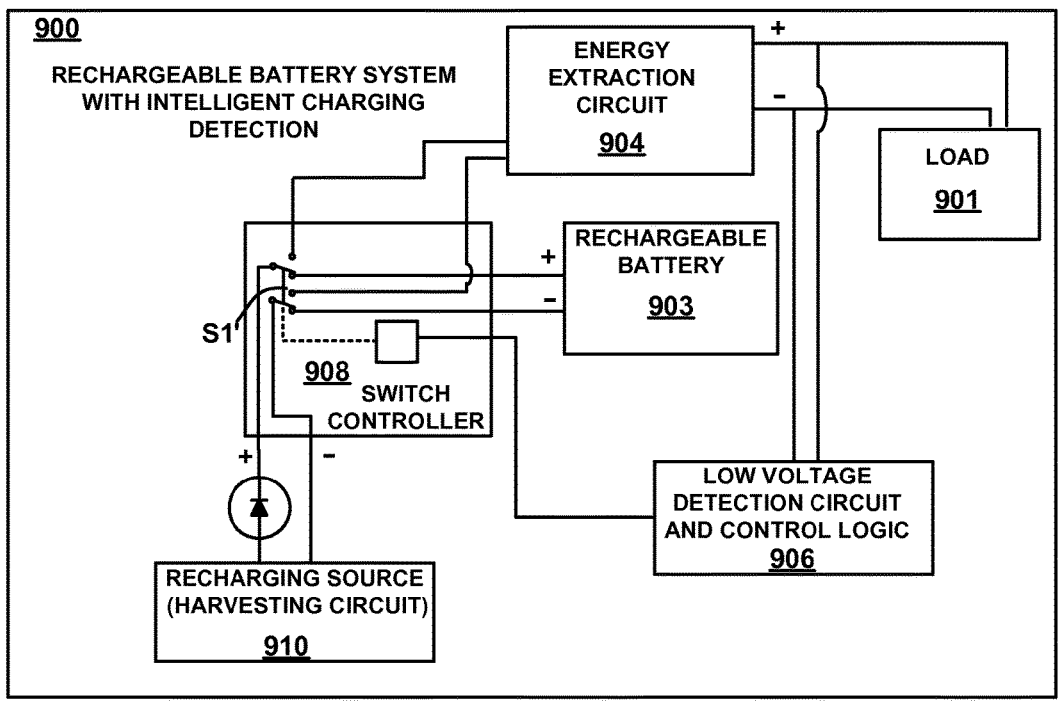
FIG. 9 depicts a block diagram schematic of a system for charging a rechargeable power storage device from which power is extracted by an energy extraction circuit, the charging being initiated once, for example, the power output of the rechargeable power storage device falls below a certain threshold in accordance with one or more embodiments.

FIG. 9 depicts a block diagram schematic of a system 900 for charging a rechargeable power storage device 903 such, for example, as a low voltage battery, from which power is extracted by an energy extraction circuit 904. The energy extraction circuit 904 directly powers a device load 901 as, for example, the active circuitry of a portable media player, mobile terminal, or other electrical appliance. In embodiments, the charging of the power storage device 903 is initiated once the power output by the rechargeable power storage device 903 falls below a certain threshold in accordance with one or more embodiments.

System 900 includes a switch controller 908 which is responsive to the output of a low voltage detector circuit 906 to initiate the recharging operation when the voltage received at load 901 falls below a threshold. Typically, the threshold is an output voltage below which the active circuitry of the load cannot function, though the threshold may alternatively be greater than this amount. Once the threshold is reached, the output of an energy harvesting circuit and/or external AC to DC power source is supplied to the energy storage device 903 and recharging is commenced. In some embodiments, once a second, or "fully charged" threshold is reached, the switch S1' is opened by switch controller 908 and the charging operation is terminated.

In addition to providing the benefits of energy extraction circuits as exemplified by the preceding examples of FIGS. 2-8, the system of FIG. 9 can avoid the premature degradation of energy storages due to improper recharging procedures. In a typical battery recharging operation, it is not uncommon for an appliance user to plug in the device well before charging is actually required, and/or well past the point where a fully charged status has been reached. Such charging operations can prematurely degrade the output performance characteristics of a battery, necessitating an early replacement.

Figure 10:
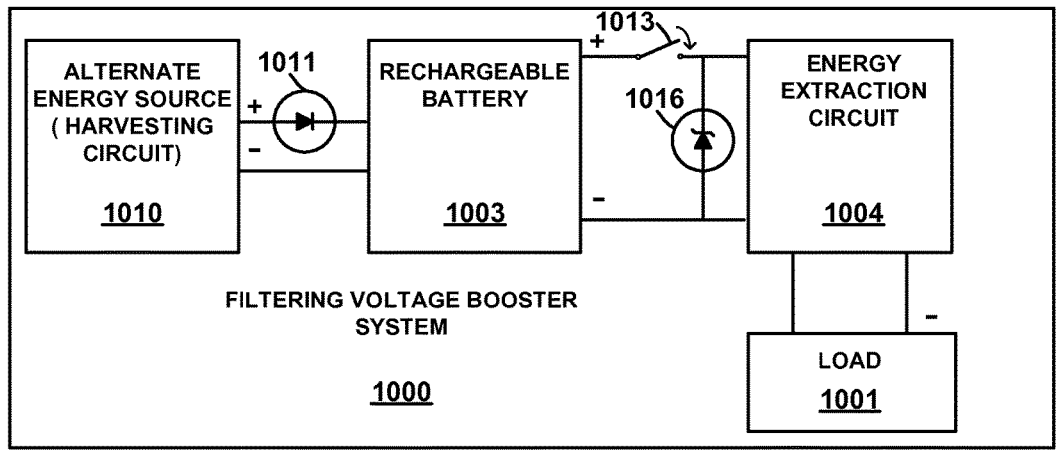
FIG. 10 depicts a block diagram schematic of a filtering and voltage boosting circuit arrangement in accordance with one or more embodiments.

FIG. 10 depicts a block diagram schematic of a filtering and voltage boosting circuit arrangement 1000 in accordance with one or more embodiments. In the arrangement 1000 of FIG. 10, an alternate energy source 1010 is connected to a diode 1011 whose cathode is connected to an energy storage device 1003 which is connected to switch 1013. When closed, switch 1013 connects the energy storage device 1003 in parallel to energy extraction circuit 1004. Energy extraction circuit 1004 is connected to and drives load 1001.

In embodiments, alternative energy source 1010 comprises a solar cell, a wind generator, a thermo-electric effect device, piezo electric current generator, a combination of any two or more of these, or some other energy source having a time varying DC voltage and current (depending, for example, on wind velocity, solar insolation, time of day, application of pressure, and/or temperature).

In an embodiment, the energy storage device 1003 is any device capable of storing electrical energy such, for example, as one or more capacitors or batteries. As the alternate energy source 1010 derives from its designed input source, the ability for its voltage to rise increases. When the voltage rises to the level required to turn on diode 1011, current flows through diode 1011 and into energy storage device 1003. When switch 1013 is in the open position and diode 1011 is turned on, current flows from alternate energy source 1010 to the energy storage device 1003 until either the voltage from the alternate energy source 1010 decreases such that it can no longer keep diode 1011 on or the energy storage device has reached its charge storage capacity. When the charge storage capacity is reached, a "counter" electromagnetic force (emf) to that provided by the alternate energy source 1010 is developed. Once switch 1013 is closed, current flows from the energy storage device 1003 through switch 1013 to energy extraction circuit 1004, which then drives load 1001 until such time that the combination of voltage and current provided by the energy storage device 1003 and alternate storage device 1010 no longer provide sufficient energy to drive the energy extraction circuit 1004 and load 1001.

The arrangement of FIG. 10 may be thought of as a filtering implementation because the integrated nature of the energy extraction circuit 1004 facilitates both (a) the delivery of a required output voltage to drive a load as load 1001 without exceeding the voltage requirements of the load. Zener diode 1016, in turn, protects the energy extraction circuit 1004 from an over voltage condition.

Figure 11:
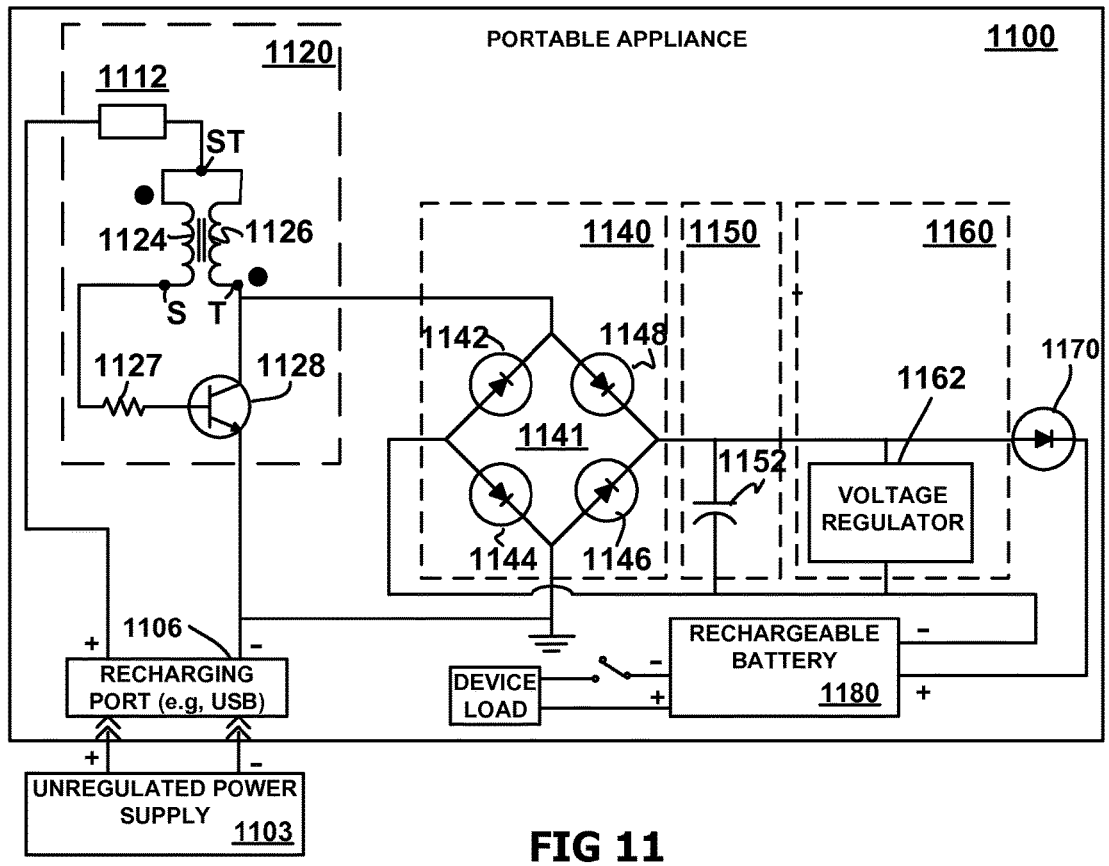
FIG. 11 depicts a circuit diagram of a rechargeable, portable appliance using an energy utilization circuit to employ an unregulated power source of greater or lesser voltage than that of an internal, rechargeable battery, according to one or more embodiments.

FIG. 11 depicts a circuit diagram of a rechargeable, portable appliance 1100 such, for example, as a mobile device (e.g. a smart phone, media player, digital camera, digital voice recorder, or the like). The appliance 1100 includes a housing dimensioned and arranged to receive a rechargeable battery 1180 and an energy extraction circuit— comprising a self-oscillating circuit 1120 having a primary winding 1124 and a secondary winding 1126, a rectifying module 1140 comprising diodes 1142, 1144, 1146, and 1148, a filtering module 1150 including capacitor 1152, and a voltage regulator 1162—to accommodate an unregulated power source 1103 of greater or lesser voltage than that of an internal, rechargeable battery 1180, according to one or more embodiments.

In the exemplary arrangement of FIG. 11, the portable appliance includes a charging port or docking station connector indicated generally at 1106 which is configurable to establish an electrical interconnection with the unregulated power source 1103. In an embodiment, the charging port 1106 is configured as a USB port, the USB port having a positive terminal for electrically coupling the unregulated power supply 1103 to the node ST of self oscillating circuit 1120. The negative terminal of the USB port is connected to the emitter of transistor 1128. Interconnecting the energy utilization circuit and the rechargeable battery is a blocking diode 1170 which ensures that current supplied via the energy extraction circuit (i.e., across the terminals of voltage regulator 1162) and current from rechargeable battery 1180 does not flow back into the energy extraction circuit.

Once unregulated power source 1103 provides voltage and current at charging port 1106, the energy extraction circuit becomes active and begins providing a voltage and current output great enough to charge rechargeable battery 1180. Such operation continues for so long as unregulated power source 1103 provides sufficient voltage and current to drive the energy extraction circuit and as the rechargeable battery 1180 remains at a lower voltage than that across the output terminals of the voltage regulator 1162. Once the voltage equals that supplied at the output terminals of the voltage regulator 1162, however, the current can no longer flow into rechargeable battery 1103 and is instead sunk through the voltage regulator. Optionally, portable appliance may be further configured with a circuit protector 1112 such, for example, as a fuse or a positive temperature coefficient (PTC) thermistor, to provide additional protection of circuit components.

Figure 12:
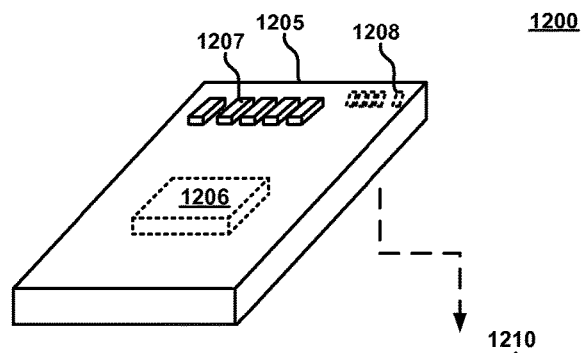
FIG. 12 depicts a perspective view of a flexible circuit board adapter implementation of a charging system adapter incorporating energy extraction and utilization according to one or more embodiments, the adapter being positionable between a portable appliance and a removable battery of the portable appliance.

FIG. 12 depicts a perspective view of a flexible circuit board implementation of a charging system incorporating energy extraction and utilization according to one or more embodiments, the charging system 1200 including an adapter 1205 positionable between the battery bay 1209 of a portable appliance and a removable battery (not shown) of the portable appliance. In an embodiment, the flexible circuit adapter 1205 has the ability to bend at minimum of a 90 degree angle and incorporates an energy extraction circuit 1206, battery contacts 1207, and chassis contacts 1208. The device chassis defines a bay 1209 having a set of mating contacts 1210 which are dimensioned and arranged for electrical engagement with chassis contacts 1208 when the flexible adapter 1205 is interposed between the battery and appliance battery bay 1209. Once connected, the appliance's battery is inserted into the chassis bay 1209 such that the battery's contacts make a physical connection to battery contacts 1207. In this installed position of the flexible adapter 1205, the energy extraction circuit 1206 is electrically coupled between the device's battery and the appliance chassis. Upon actuation of an appliance on/off switch or push button operator (not shown), current flows from the battery into the energy extraction circuit 1206 via contacts 1207. This in turn powers the appliance chassis circuitry and causes energization of the appliance.

Figure 13:
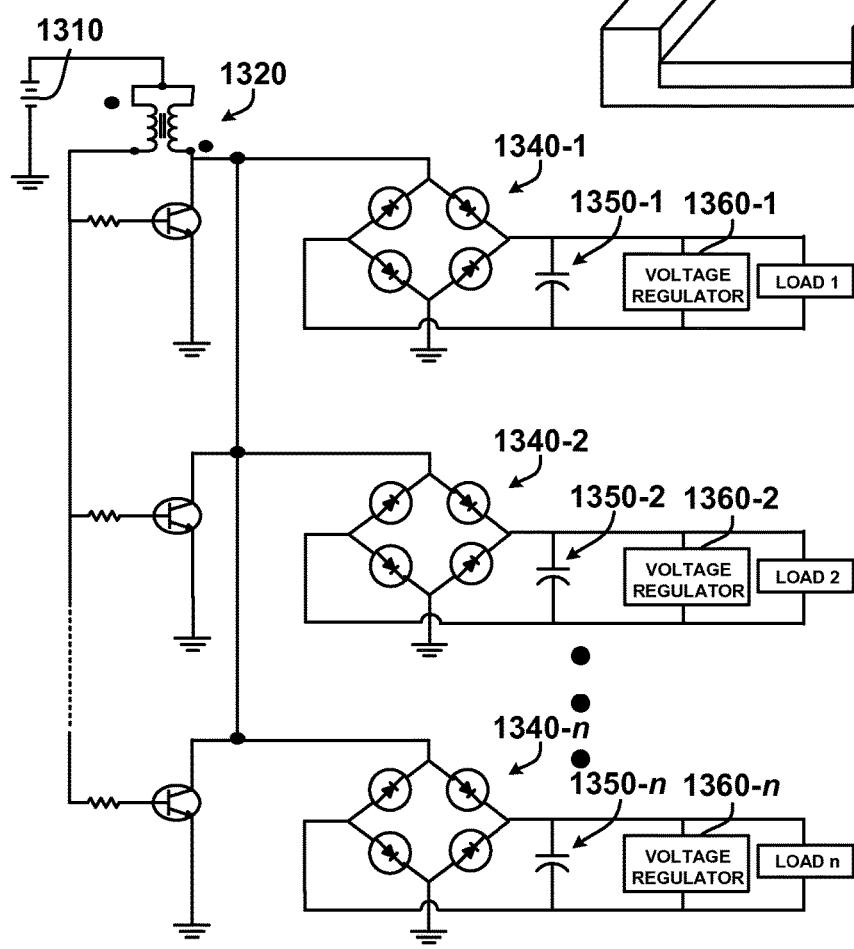
FIG. 13 depicts an electrical schematic diagram of an energy extraction system utilizing a single self-oscillating circuit and configured to extract power from a single energy storage device and drive a plurality of loads at respectively different voltages, according to one or more embodiments.

FIG. 13 depicts an electrical schematic diagram of an energy extraction system 1300 utilizing a single self-oscillating circuit 1320 and configured to extract power from a single power storage device 1310 to drive a plurality of loads at respectively different voltages, according to one or more embodiments. The respective rectifying, filtering, and regulating modules 1340-1 to 1340-$n$, 1350-1 to 1350-$n$, and 1360-1 to 1360-$n$, correspond to the structures 140, 150, and 160 depicted in Figures.

Figure 14:
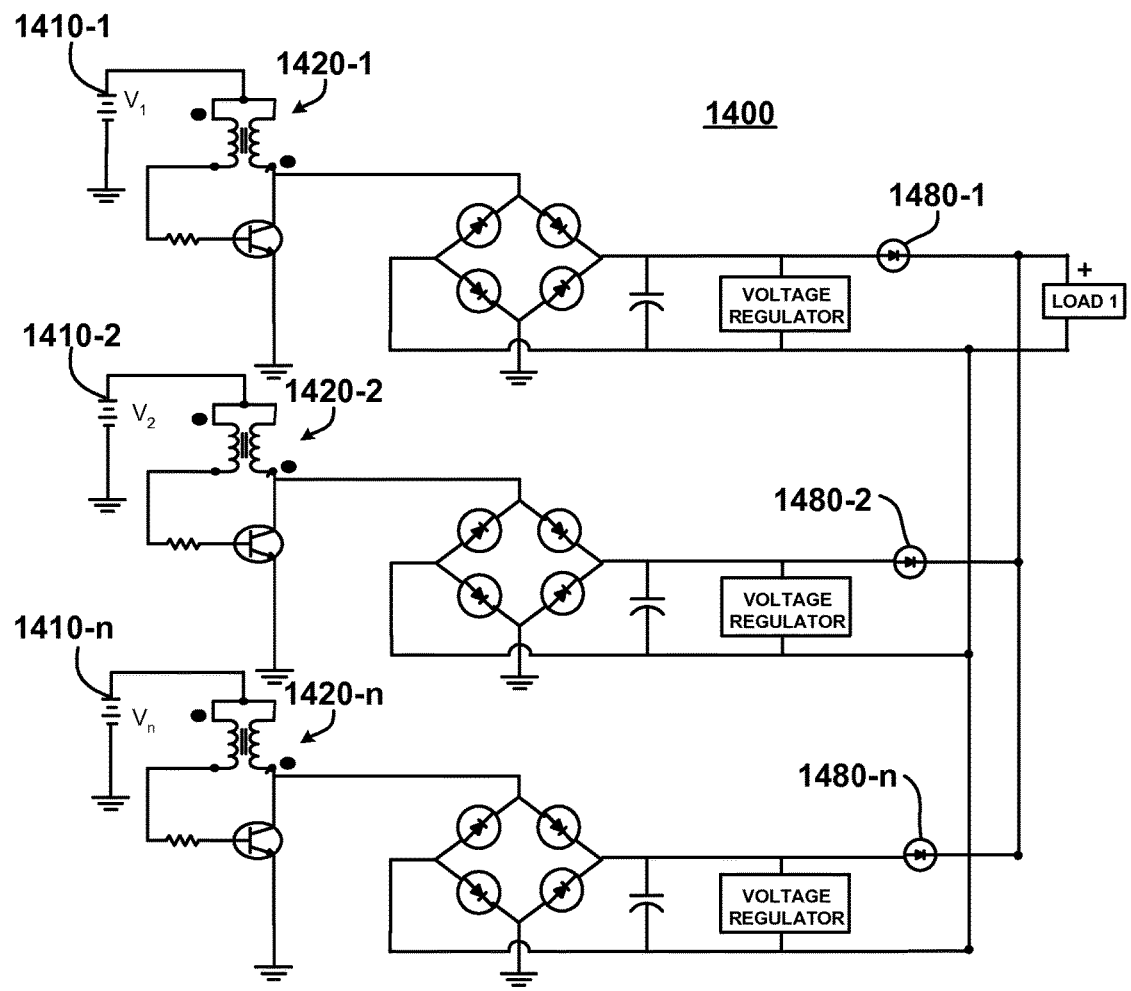
FIG. 14 depicts an electrical schematic diagram of an energy extraction system utilizing a plurality of self-oscillating circuits and configured to extract power from a corresponding plurality of energy storage devices at respectively different voltages, according to one or more embodiments.

FIG. 14 depicts an electrical schematic diagram of an energy extraction system 1400 utilizing a plurality of self-oscillating circuits as 1420-1, 1420-2, and 1420-$n$, the system 1400 being configured to extract power from a corresponding plurality of energy storage devices as batteries 1410-1, 1410-2, and 1410-$n$, at respectively different voltages, according to one or more embodiments. In some embodiments, each energy extraction stage is driven at a different voltage as voltages $V_1$, $V_2$ and $V_n$. The output of each stage employs a corresponding voltage regulator 1460-1, 1460-2 and 1460-n to ensure that the voltage output by each stage is equal. Moreover, each stage utilizes a diode 1480-1, 1480-2 and 1480-n, at the output of its voltage regulator, to ensure that current flows not from one stage into any of the other stages but rather into the load.

As a stage's input voltage drops to a level such that it can no longer provide adequate voltage to the toroid to cause an oscillation of great enough magnitude to turn on the transistor and drive its corresponding stage, those stages with an adequate charge remaining within their respective energy source to drive the energy extraction circuitry of their stage will continue to produce energy and may therefore continue to drive the load. In this way, multiple voltage sources can be used to drive a load, and the respective voltage sources may, but need not, have different voltages. If, for example, the voltage sources are batteries rated at the same nominal voltage (e.g. 1.5V), then less than all of these batteries may be removed and replaced without de-energizing the circuit being powered. Such "hot-swapping" operation might entail replacement of each battery "one-at-a-time" in seriatim. Alternatively, it may be possible to replace only one battery of a plurality and leave the rest for later replacement. In this latter regard, identification of the battery or batteries needing replacement might be facilitated by incorporating a respective visible indicator (i.e., an LED) associated with each battery, wherein illumination of the LED begins when voltage source(s) require replacement.

Figure 15:
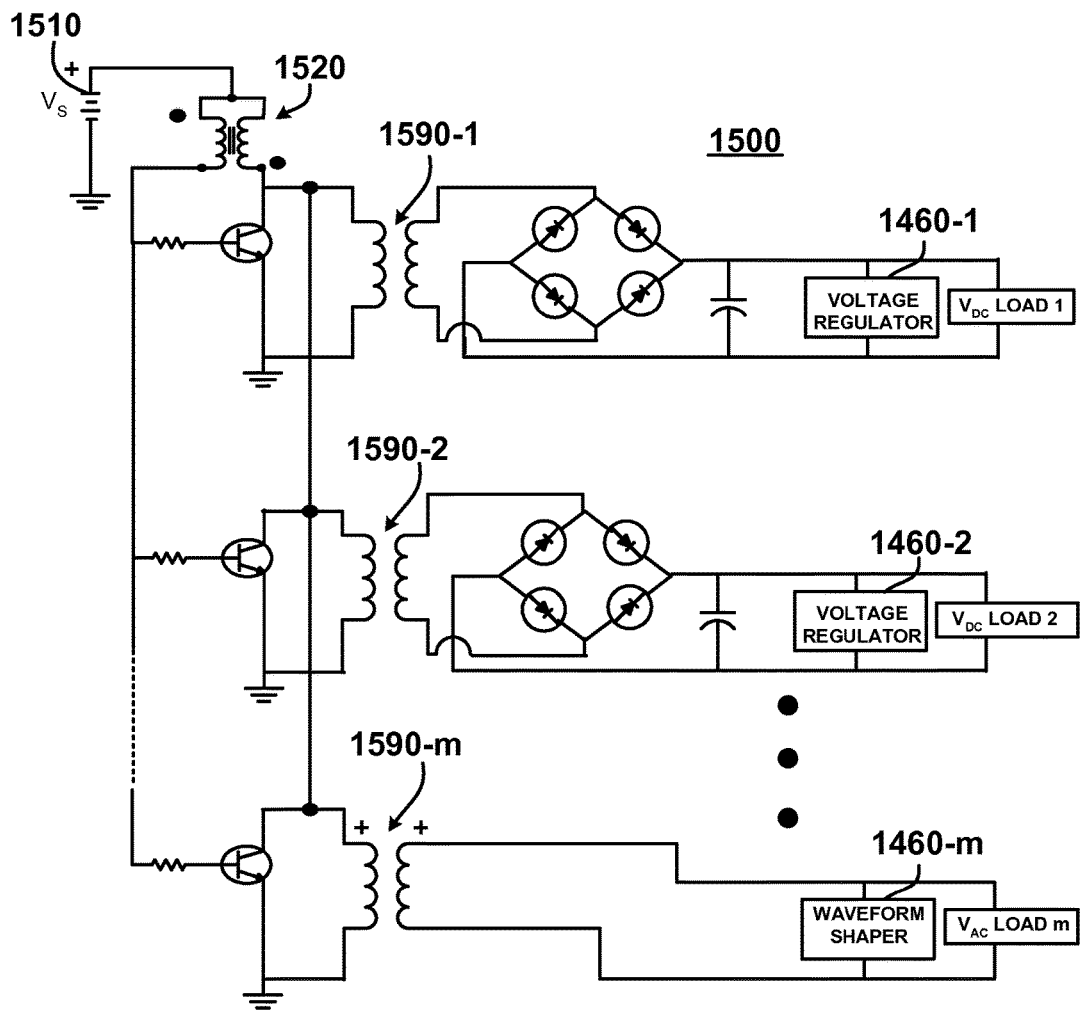
FIG. 15 depicts an electrical schematic diagram of an energy extraction system utilizing a single self-oscillating circuit and configured to drive multiple loads, where at least one of the loads may require an alternating current input and at least one of the loads may require a direct current input, in accordance with one or more embodiments.

FIG. 15 depicts an electrical schematic diagram of an energy extraction system 1500 utilizing a single power supply 1510, a single self-oscillating circuit 1520, and a plurality of transformer stages to corresponding plurality of loads. In some embodiments, at least one of the loads, as loads $V_{DC}$ Load 1 and $V_{DC}$ Load 2, requires a direct current output and at least one of the loads, as $V_{AC}$ Load m may require an alternating current output. Depending upon the ratio of primary turns to secondary turns in the transformers 1590-1 to 1590-m employed in a particular stage of the system 1500, the output voltage supplied to the DC voltage rectifier modules 1560-1 and 1560-2 and/or to the AC voltage waveform shaping module 1560-m can be either increased (performing a boost function) or decreased (performing a step down function).

Figure 16:
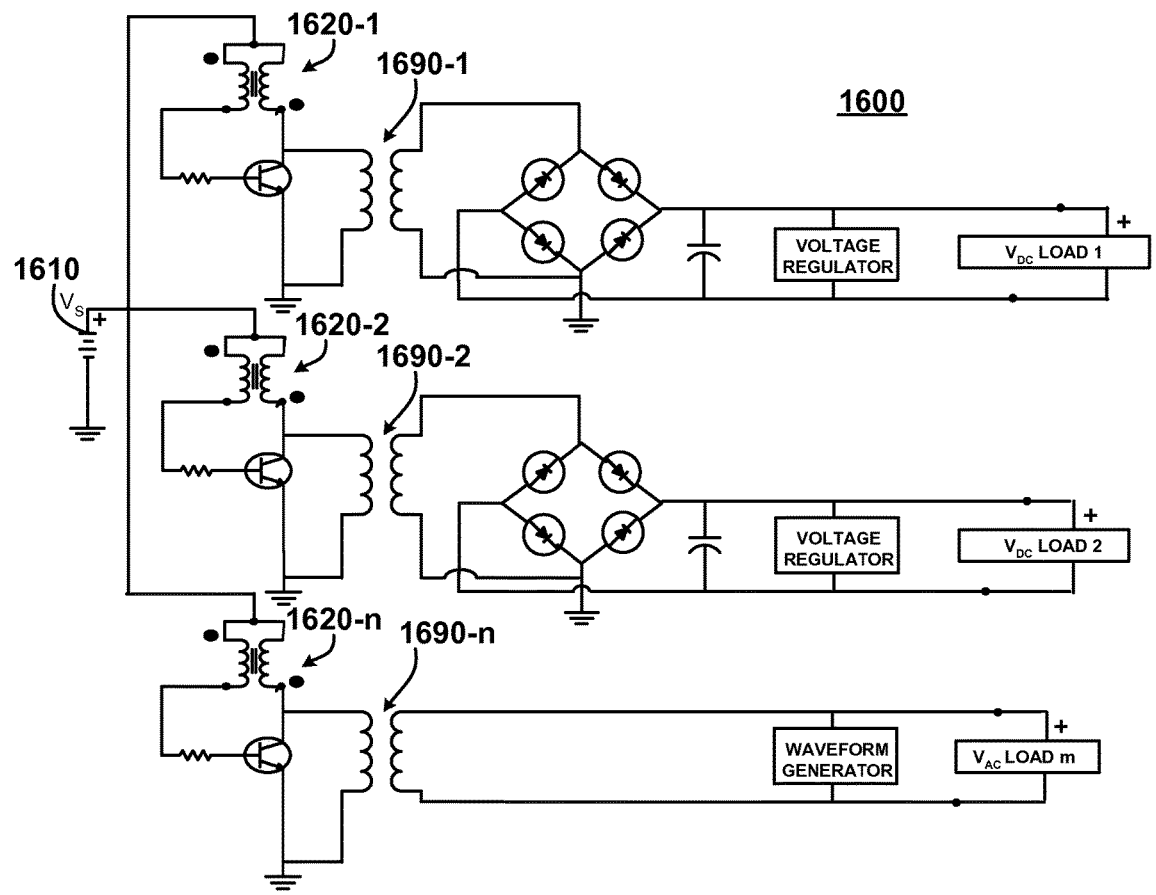
FIG. 16 depicts an electrical schematic diagram of an energy extraction system utilizing a plurality of self-oscillating circuits and configured to extract power from a single energy storage device to drive multiple loads, where at least one of the loads may require an alternating current input and at least one of the loads may require a direct current input according to one or more embodiments.

FIG. 16 depicts an electrical schematic diagram of an energy extraction system 1600 utilizing a plurality of self-oscillating circuit modules as modules 1620-1 to 1620-n and configured to extract power from a single energy storage device 1610 to drive multiple loads, where at least one of the loads, as loads $V_{DC}$ Loads 1 and 2 may require a direct current input and at least one of the loads may require an alternating current input according to one or more embodiments. In the embodiment of FIG. 1600, the single power supply 1610 is employed to drive multiple independent energy extraction stages. A separate transformer 1690-1 to 1690-n is used in each stage to provide the desired output voltage and also isolation between each load and the power supply. A toroidal transformer is respectively chosen for each stage according to the independent power requirements applicable to that stage. In essence, each stage's toroid core may have a different size, shape, and material, and the number of turns used in each of the primary and secondary windings may be varied, in accordance with the specifications required for the particular stage of the circuit to drive that stage's load.

Figure 17:
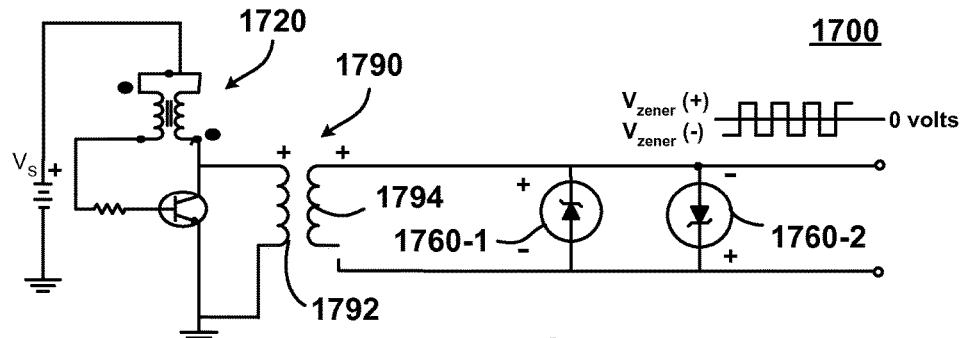
FIG. 17 depicts an electrical schematic diagram of an energy extraction system which utilizes a single self-oscillating circuit, isolating transformer, and a pair of Zener diodes configured to deliver a clipped waveform approximating a square wave.

FIG. 17 depicts an electrical schematic diagram of an energy extraction system 1700 which utilizes a single self-oscillating circuit 1720, isolating transformer 1790, and a pair of zener diodes 1760-1 and 1760-2 configured to deliver a clipped waveform approximating a square wave. In an embodiment, as the voltage is applied to the toroid and transistor stage of the self-oscillating circuit 1720, an alternating current signal is generated, producing an oscillation. This oscillation is applied to the primary stage 1792 of the transformer 1790. The signal is then amplified or attenuated depending upon the number of primary and secondary turns of transformer 1790. The output of the secondary stage 1794 of the transformer 1790 is applied to the Zener diode 1760-1 and 1760-2. Depending upon the magnitude of the signal, if it exceeds the voltage at which the Zener diodes conduct, a waveform approaching a square wave may be generated as $V_{out}$.

Figure 18:
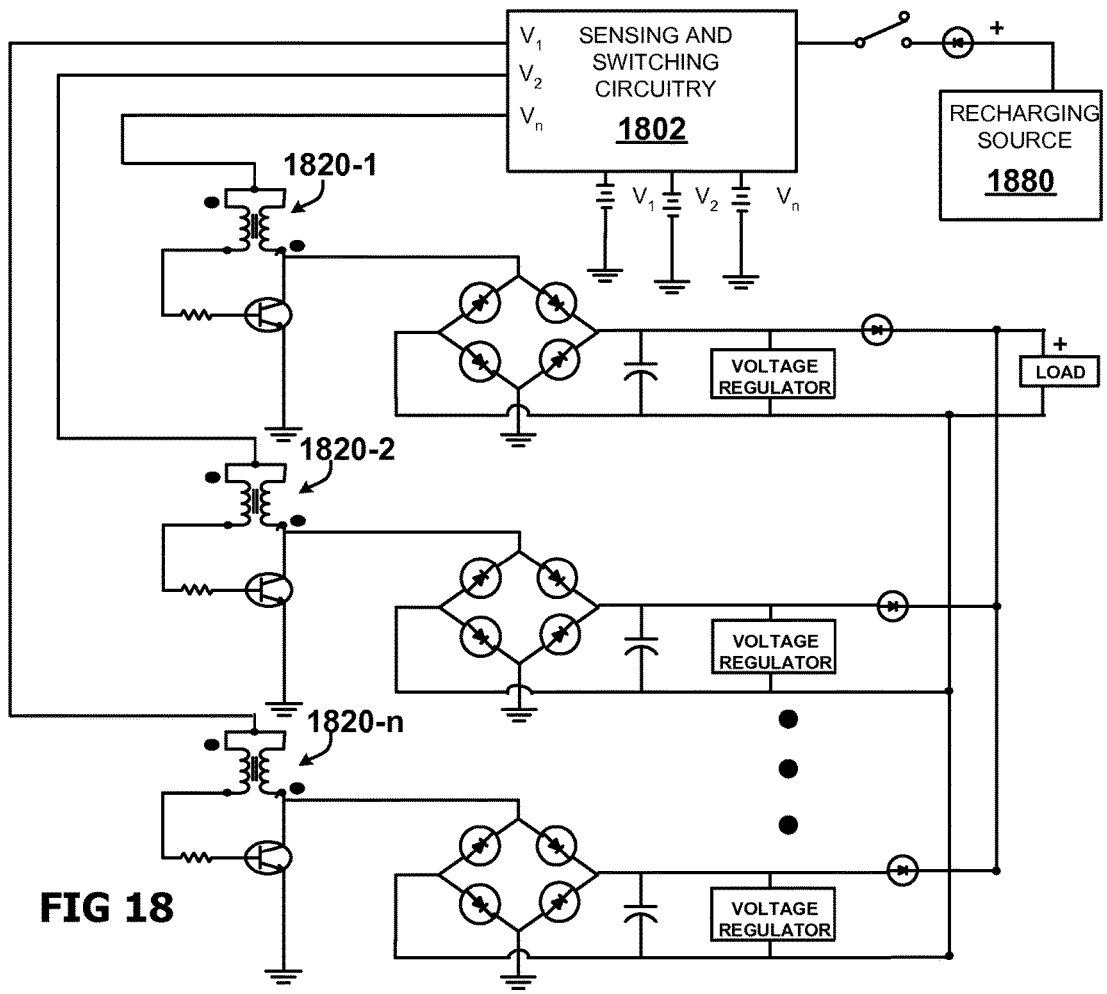
FIG. 18 depicts an electrical schematic diagram which utilizes a single self-oscillating circuit to drive a load with auto-sensing of when a rechargeable power source needs to be recharged and of when an alternate power supply should be used.

FIG. 18 depicts a schematic diagram of an energy extraction system 1800 wherein multiple stages of an energy extraction system are connected to drive a load. In an embodiment, all power sources as power sources $V_1$, $V_2$ and $V_n$ are rechargeable. Depending upon the operation of sensing and switching circuitry 1802, the input voltage sources may all be connected to the load simultaneously, a subset of these may be connected to the load at any given time, or a single one of them may be connected to the load at any single moment in time. A plurality of self-oscillating circuit modules as modules 1820-1 to 1820-n extract the power from any of energy storage devices $V_1$ to $V_n$. Once a power source is detected to be no longer capable of providing a high enough voltage to the circuitry and/or load, sensing circuitry causes the connection to the input of the circuitry to be disengaged and instead to commence receiving charging energy from recharging source 1880. As rechargeable power sources $V_1$ to $V_n$ are determined to be fully charged, they are automatically switched back to provide energy to drive the circuitry and provide power to the load.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A system for extracting energy from an energy storage device, the energy storage device being configured to supply direct current (DC) energy at a nominal voltage rating, comprising:
   a first node dimensioned and arranged to receive direct current energy from the energy storage device;
   a self-oscillating circuit including a transformer having a ferrite core and primary and secondary windings about the ferrite core,
      wherein a positive terminal of the primary winding is tied to the negative terminal of the secondary winding at the first node, and
      wherein a positive terminal of the secondary winding is coupled to a second node, the second node being coupled to a load requiring power to be supplied at one of a voltage less than, equal to, or higher than the nominal voltage;
   a transistor electrically coupled to at least one of the primary winding and the secondary winding;
   a first rectifying circuit having a first terminal coupled to the positive terminal of the secondary winding and a second terminal coupled to ground;
   a second transistor having a base resistively coupled to a negative terminal of the primary winding and a collector coupled to the second node; and
   a second rectifying circuit having a first terminal coupled to the positive terminal of the secondary winding and a second terminal coupled to ground,
   wherein each of the first and second rectifying circuits are coupled to a respective load of a device.

2. The system of claim 1, wherein the first terminal of each of the first and second rectifying circuits is inductively coupled to the positive terminal of the secondary winding by a respective isolating transformer.

3. A system for extracting energy from an energy storage device, the energy storage device being configured to supply direct current (DC) energy at a nominal voltage rating, comprising:
   a first node dimensioned and arranged to receive direct current energy from the energy storage device;
   a self-oscillating circuit including a transformer having a ferrite core and primary and secondary windings about the ferrite core,
      wherein a positive terminal of the primary winding is tied to the negative terminal of the secondary winding at the first node, and
      wherein a positive terminal of the secondary winding is coupled to a second node, the second node being coupled to a load requiring power to be supplied at one of a voltage less than, equal to, or higher than the nominal voltage;
   a first transistor electrically coupled to at least one of the primary winding and the secondary winding;
   a rectifying circuit having a first terminal coupled to the positive terminal of the secondary winding and a second terminal coupled to ground;
   a second transistor having a base resistively coupled to a negative terminal of the primary winding, an emitter, and a collector coupled to the second node; and
   an alternating current waveform shaping circuit coupled across the positive terminal of the secondary winding and emitter of the second transistor, wherein each of the rectifying circuit and waveform shaper are also coupled to a respective load of an electrical appliance.

4. The system of claim 3, wherein each of the rectifying circuit and alternating current waveform shaping circuit are inductively coupled across the positive terminal of the secondary winding and emitter of the second transistor by a respective secondary coil of an isolating transformer.

5. A system for extracting energy from an energy storage device, the energy storage device being configured to supply direct current (DC) energy at a nominal voltage rating, comprising:
   a first node dimensioned and arranged to receive direct current energy from the energy storage device;
   a self-oscillating circuit including a transformer having a ferrite core and primary and secondary windings about the ferrite core,
      wherein a positive terminal of the primary winding is tied to the negative terminal of the secondary winding at the first node, and
      wherein a positive terminal of the secondary winding is coupled to a second node, the second node being coupled to a load requiring direct current (DC) power to be supplied at one of a voltage less than, equal to, or higher than the nominal voltage; and
   a transistor electrically coupled to at least one of the primary winding and the secondary winding,
      wherein the transistor includes a base resistively coupled to a negative terminal of the primary winding and a collector coupled to the second node,
   a third node dimensioned and arranged to receive direct current energy from the energy storage device;
   a second self-oscillating circuit including a second transformer having a ferrite core and primary and secondary windings about the ferrite core,
      wherein a positive terminal of the primary winding of the second transformer is tied to the negative terminal of the secondary winding of the second transformer at the second node, and
      wherein a positive terminal of the secondary winding of the second transformer is coupled to a fourth node, the fourth node being coupled to a second load requiring power to be supplied at a voltage one of less than, equal to, or higher than the nominal voltage; and
   a second transistor having a base resistively coupled to a negative terminal of the primary winding of the second transformer and a second collector coupled to the fourth node.

6. The system of claim 5, further including
   a first rectifying circuit having a first terminal coupled to the positive terminal of the secondary winding of the first transformer and a second terminal coupled to ground; and a second rectifying circuit having a first terminal coupled to the positive terminal of the secondary winding of the second transformer and a second terminal coupled to ground.

7. The system of claim 6, wherein each of the first rectifying circuit and the second rectifying circuits is a full wave rectifier having third and fourth terminals connected across a corresponding load.

8. The system of claim 7, wherein the third and fourth terminals of each rectifier are connected across a corresponding filtering module.

9. The system of claim 8, wherein the filtering module comprises a capacitor connected across the load.

10. The system of claim 7, wherein the third and fourth terminals are connected across a voltage regulation module.

11. The system of claim 10, wherein the voltage regulation module comprises a Zener diode.

12. A system for emulating a battery having a first form factor and a nominal voltage rating, comprising:
 a housing corresponding to the first form factor having a first external electrode and a second external electrode, the housing defining an interior volume dimensioned and arranged to receive a battery having a second form factor smaller than the first form factor; and
 a circuit for extracting energy from a battery received within the interior volume, the received battery being configured to supply direct current (DC) energy, the circuit including:
  a first node dimensioned and arranged to receive direct current energy from the received battery;
   a self-oscillating circuit including a transformer having a ferrite core and primary and secondary windings about the ferrite core, wherein a positive terminal of the primary winding is tied to the negative terminal of the secondary winding at the first node, and wherein a positive terminal of the secondary winding is coupled to a second node, the second node being coupled to a load requiring power to be supplied at a voltage equal to the nominal voltage; and
  a transistor electrically coupled to at least one of the primary winding and the secondary winding,
   wherein the transistor includes a base resistively coupled to a negative terminal of the primary winding and a collector coupled to the second node.

13. The system of claim 12, wherein the received battery is configured to supply DC energy at the nominal voltage.

* * * * *